March 24, 1959  T. W. BIRK  2,878,793
ROTARY INTERNAL COMBUSTION ENGINE
Filed Oct. 23, 1956
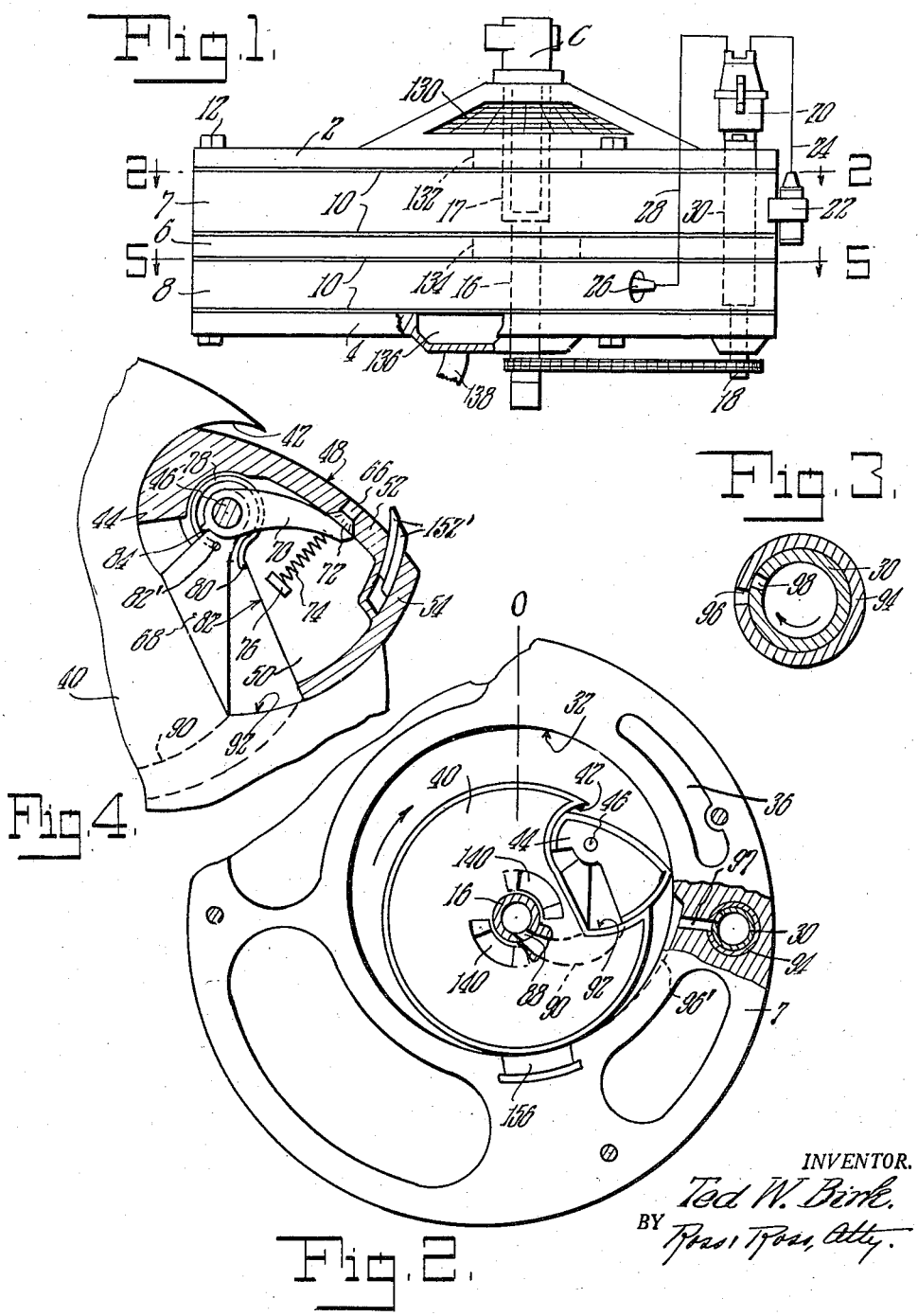

March 24, 1959
T. W. BIRK
2,878,793
ROTARY INTERNAL COMBUSTION ENGINE
Filed Oct. 23, 1956
2 Sheets-Sheet 2
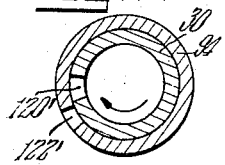
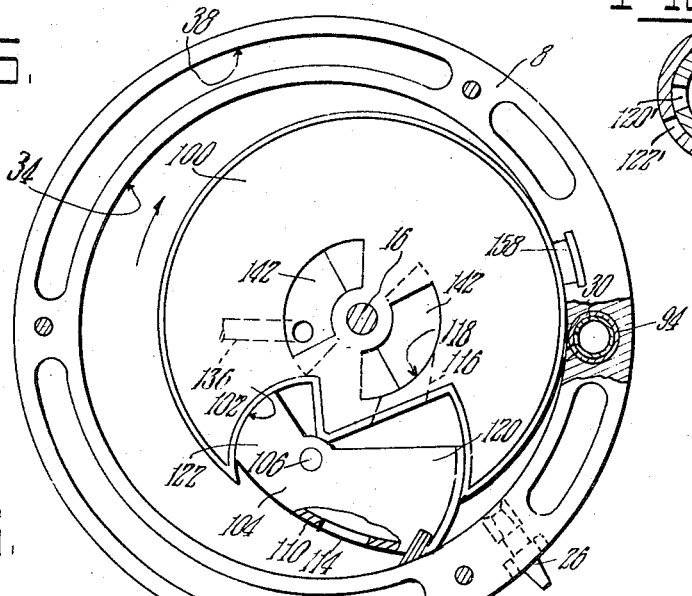
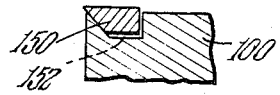
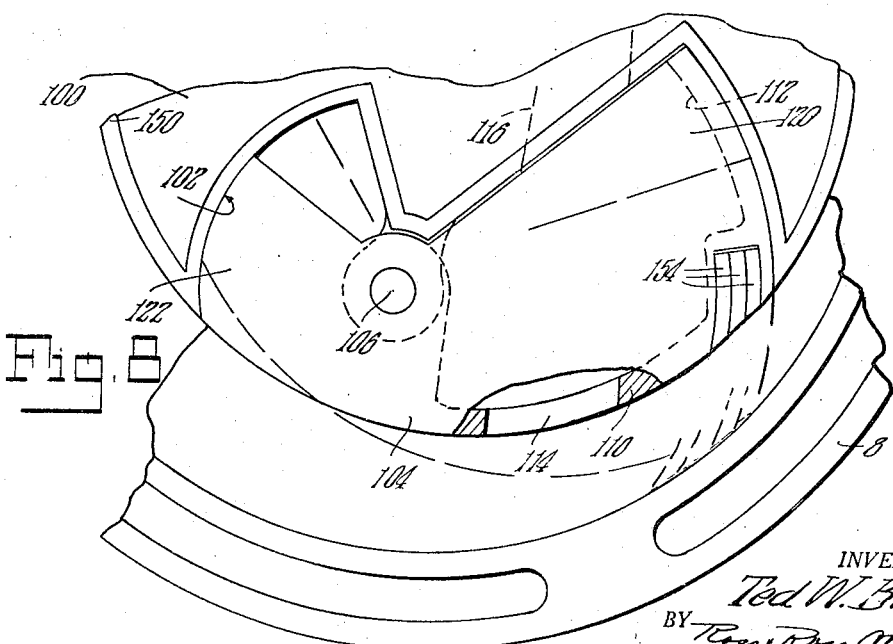
INVENTOR.
Ted W. Birk.
BY Ross & Ross, Attys United States Patent Office 2,878,793
Patented Mar. 24, 1959

2,878,793

ROTARY INTERNAL COMBUSTION ENGINE

Ted W. Birk, Stephentown, N.Y.

Application October 23, 1956, Serial No. 617,816

7 Claims. (Cl. 123—17)

This invention relates to new and useful improvements in internal combustion engines, and this application is a continuation in part of an application filed by me March 17, 1954, Serial No. 416,860, now abandoned.

The principal object of the invention is directed to the provision of an internal combustion engine of the rotary type wherein a combination of charging and power units are arranged for simultaneous operation to produce greater power or troque per weight than has been known heretofore.

Among the novel features of the invention is the provision of means to reduce friction and unbalance thereby to enhance power output and efficiency generally.

According to further features of the invention, components of separate charging and pressure chambers are connected together for simultaneous operation in timed relation for the maximum efficiency and power output.

With the above primary objects in view, it is another object of my invention to provide a construction of the above described character in which the number of operating parts is greatly reduced, and which is compact in accordance with the demands and desires of manufacturers and purchasers alike and which is not only distinctive in its appearance and practical in its value but also reliable in its operation and efficient in its use.

It is still further object to provide a device which is contructed of relatively simple parts which are adapted to be readily assembled and which, when once assembled, are positively and securely retained in operative relationship and which cannot be readily separated from each other, either accidentally or otherwise.

The novel features of the invention will be described in the form at present preferred, but it will be understood that various changes may be made in the form of the invention without departing from the spirit and scope thereof.

In the drawings:

Fig. 1 is a side elevational view of a rotary internal combustion engine, embodying the novel features of the invention;

Fig. 2 is a sectional plan view on the line 2—2 of Fig. 1;

Fig. 3 is a sectional view through the rotary valve of the fuel connection, and taken at the charging chamber;

Fig. 4 is an enlarged plan view of the vane of the charging chamber;

Fig. 5 is a sectional plan view on the line 5—5 of Fig. 1;

Fig. 6 is a sectional plan view through sealing means for the rotors, and vanes of the rotors;

Fig. 7 is a sectional view through the rotary valve of the fuel connection taken at the power chamber; and Fig. 8 is an enlarged plan view of the vane of the power cylinder.

Referring now to the drawings more in detail, the novel features of the invention will be described in detail. The general structure of the engine of the invention includes a cap plate 2, a base plate 4 and a central plate 6, with a charging chamber member 7 and a power chamber member 8 between the plates, as shown. The plates and chamber members have packing or sealing gasket members 10 therebetween, and said plates and chamber members are secured together, peripherally thereof, by bolts 12, as indicated.

The upper plate 2 supports a carburetor, indicated by C, which may be of usual form, for the admixture of fuel and air, as may be desired. A drive or main shaft 16 is rotatable in the plates 2, 4 and 6 and its upper end 17 is hollow and in communication with the carburetor for conducting the fuel to the rotor and vane of the charging chamber, as will appear.

The drive shaft 16 is connected, as shown, to a shaft 18 of a distributer 20, of usual form, which is suitably secured to the engine. An ignition coil 22 is connected to the distributer 20 by connection 24, and said distributer is connected to a spark plug 26 of the power chamber, by connection 28. The spark plug is energized, in the well known manner, through the distributer.

The shaft 18, intermediate its ends, is hollow, as at 30, for conducting fuel from the charging chamber member to the power chamber member therebelow.

The charging chamber member 7, shown in plan in Fig. 2, has a circular bore or chamber 32. The power chamber member 8 has a similar bore 34. Spaces such as 36 and 38 in the members 7 and 8 respectively are in communication with spaces in the plate 6, not shown, and are provided to form a water jacket, for cooling purposes, usual with internal combustion engines.

The axis of rotation of shaft 16 is disposed eccentrically of the chamber bores. The upper hollow portion 17 of said shaft extends downwardly to the upper charging chamber member.

A charging rotor 40 in the charging chamber member, is fixed to the shaft portion 17. Said rotor, at one side thereof, is cut away or provided with a vane recess 42. A vane 44 is journalled on a shaft 46, for swinging between inner and outer positions, as the rotor is in rotation.

Said vane has an outer face, preferably complimental to the curvature of the wall of the chamber, and has spaced upper and lower walls 50, a side wall 52, and an end wall 54.

Said vane is partly hollow, as shown, and while swingable in the recess of the rotor, the walls of the recess and rotor form a closed space in all positions of the rotor.

The wall 52 is provided with an outlet port 66. A strut 68 of the rotor extends into the recess around shaft 46, and between the walls 50 of the vane. A valve arm 70 over the strut is journalled on shaft 46, and has a valve 72 for seating over and closing the port 66. A spring 74 between arm 70 and an abutment 76 of the lower wall 50 of the vane urges the arm and thereby the valve to closed position over the port 66.

A circular spring 78 has an inner end 80 engaging an inner edge 82 of the vane 44 and an opposite end 82' disposed in a recess of the rotor strut. This spring urges the vane counterclockwise, or outwardly, so that the vane engages the wall of the chamber, as the rotor rotates.

The arm 70 has a depending stop 84 for abutting the portion 68 of the rotor to limit counterclockwise swinging of the arm 70.

The springs and stop are arranged so that, in an outer position of the vane, the port 66 is open. Fuel in the space between the vane and recess of the rotor is delivered to the chamber through said port 66.

The shaft 16 is provided with an outlet 88 from the hollow end 17 thereof. This is in communication with a gradually widening fuel passage 90 of the rotor, terminating in an outlet 92 into the recess of the rotor, and into the hollow vane.

The valve 30 is rotatable in a fixed tube 94 extending between the charging and power chambers. Said tube has an inlet opening 96 for fuel, and the valve 30 has an intake opening 98 for said fuel to be directed downwardly to the power chamber. The valve 30 is shown in closed position, in Fig. 3, and is rotated, from the drive shaft 16, as described.

With the rotor 40 in rotation, fuel is drawn downwardly thereby, through the hollow portion 17 of shaft 16, into the space formed by the hollow vane and recess of the rotor. In rotation of the rotor through a certain angle, the vane swings outwardly sufficiently for said vane to swing away from valve 72. Fuel then enters the chamber through port 66, rearwardly of the vane.

Fuel in the chamber, forwardly of the vane, is compressed between the vane and the converging periphery of the rotor and wall of the chamber, to be discharged through a passage 97 leading to the valve 30, see Fig. 2. Said valve 30 is timed for opening to receive the compressed fuel.

Thus, in each revolution of the rotor 40, a charge of fuel is discharged into the charging chamber and a charge thereof is compressed and discharged to the power chamber. The valve 30 is timed to receive successive charges of fuel.

A circumferential groove 96' is provided in the wall of the charging chamber.

As the outer point of the vane moves from the position shown in Fig. 2, a small amount of compressed fuel forwardly of the vane mixes with the charge of fuel behind the vane. The compressed fuel, being somewhat higher in temperature than the new charge due to friction, contributes to the compression and vaporizing of the new charge, to enhance the operating efficiency of the engine.

A power rotor 100 in the power chamber 8 is fixed to the shaft 16 and is provided on the periphery thereof with a recess 102. A power vane 104 is journalled at 106 in the recess for swinging between inner and outer positions.

Said vane 104 has a forward side wall 110 and an end wall 112. In outer and inner positions thereof, these walls, in cooperation with the walls of the recess, form a closed space. The forward side wall is provided with an inlet 114 for exhaust into and through the vane to a channel 116 of the rotor communicating with an outlet 118.

Fuel, under pressure in the valve 30, passes through a port 120' thereof, when in register with an outlet 122' of the tube 94.

Fuel behind the vane 104, when ignited by the sparking plug 26, in expanding brings about rotation of the rotor. Shaft 16 is rotated thereby so that the charging rotor 40 is rotated for its function.

In each revolution of the rotor 100, a charge of fuel behind the vane is ignited and burned gases forwardly of the vane are exhausted.

The vane 104 of Figs. 5 and 8, at its right hand end 120, is hollow, and at its left hand end 122, is relatively solid. Said vane is in its inner position in Fig. 8. The pivotal connection 106 between the vane and rotor 100 is such that opposite ends of the vane are in balance in all positions thereof relative to said pivot. In the inner position of the vane, the mass or weight thereof is equally divided relative to a plane parallel to and extending through the longitudinal axis of shaft 16 and pivotal connection 106. In clockwise rotation of the rotor 100, and in the swinging of the outer end 120 of the vane clockwise and outwardly, a relatively greater portion of the mass or weight of the vane is disposed to the left of said plane than when the vane is in its inner position.

While a single vane is shown in the charging and power chambers, it may be desired to employ plural vanes, or to employ plural power chambers, and a single charging chamber.

The plate 2 is provided with an air inlet 130 and a vertical central air passageway, indicated by 132. The plate 6 is provided with a similar passageway 134. The lower plate 4 is provided with an exhaust chamber 136 from which extends an exhaust outlet 138.

The charging rotor 40 and power rotor 100 are provided with openings 140 and 142 respectively. Air is drawn from the inlet 130 downwardly through the openings of the plates and rotors for its cooling effect on exhaust gases.

The opposite ends of the openings 140 and 142 of the rotors are arranged angularly and in such a manner that, in rotation of the rotors, the openings operate with a suction action to draw air downwardly to provide the cooling effect.

Upper and lower sides of the edges of the rotors and vanes are provided with sealing means, as shown in Fig. 6. Said means includes metallic sealing members or strips 150 disposed in grooves 152 of the rotors and vanes, as shown in connection with rotor 100. The sealing members 150 slidably engage the plates at upper and lower sides of the rotors and vanes.

Other sealing means is provided for the vanes. Such includes members 152, which are slidable in the vane 44, as in Fig. 4. Similar members 154 are provided in vane 104, see Fig. 8. Outer ends of said sealing members wipe the walls of the charging and power chambers, as the rotors revolve therein.

Sealing means for the rotors consist of members 156 and 158 of the charging and power chambers. These are engaged by the peripheries of the rotors.

It will be observed, as the rotors are simultaneously in rotation, that successive charges of fuel are drawn into the charging chamber, compressed therein, and discharged through the valve into the power chamber. Ignition of successive charges in the power chamber results in rotation of the power rotor to provide the desired torque and speed delivered by the main shaft 16.

The relative timing of the operation of the components may be accomplished by one skilled in the art. The following is an example of the timing.

0-degree position of the shaft 16 is represented by 0 in Fig. 2. Relative thereto, the tip of the charger vane 44 is midway of the seal 156. The following angular positions are in relation to 0. Intake valve 72 of the charge vane 44 opens and closes at 126 and 255 degrees respectively. The release channel 96' will be open rearwardly of the tip of the vane 44 at 262 degrees.

Valve 30 is open to the power unit at 198 degrees and is open to the charger unit at 220 degrees for the transfer of a charge of fuel. Said valve 30 is closed to both the charging and power unit at 260 degrees, at which normal ignition occurs.

The foregoing are in relation to the 0 position shown in Fig. 2, are approximate, and may be varied.

The tip of the vane 104 of the power chamber is midway of the seal 158 at 180 degrees from 0 position of the shaft.

It will be observed that the engine is arranged for maximum thermal efficiency. Fuel flows but a short distance from the charging to the power chamber, and a minimum of effort is required in accomplishing the desired maximum of compression.

Various changes and modifications may be made without departing from the spirit and scope of the invention. Therefore I desire to be limited, if at all, by the following claims, rather than by the foregoing description.

What it is desired to claim and secure by Letters Patent of the United States is:

1. A rotary internal combustion engine comprising in combination, a structure having separate and adjacent charging and power chambers, a mainshaft journalled in said structure and extending through the chambers thereof, valve means rotatable in said structure for receiving compressed fuel from the charging chamber and conducting the same to the power chamber, operative connections between said mainshaft and valve means for rotating the latter from the former, charging and power rotors in the charging and power chambers fixed to said mainshaft and each provided in the periphery thereof with a recess for a vane, charging and power vanes journalled in the recesses of said charging and power rotors for swinging movements between inner and outer positions and having portions wiping the walls of the chambers on rotation of said rotors, the recess and vane of said charging rotor formed to provide a closed fuel space, said mainshaft having means to deliver fuel to said closed space, delivery means for delivering fuel from the closed space of said charging rotor to the charging chamber, passage means from said charging chamber to said valve means, said structure provided with an exhaust chamber, said structure and rotors provided with an air passageway into said exhaust chamber, said valve and power chamber having means for the flow of fuel into said chamber, and the power rotor and power vane provided with passage means for exhaust into said exhaust chamber.

2. A rotary internal combustion engine as set forth in claim 1 wherein said valve means includes a single hollow member having ports to receive compressed fuel and to discharge the same.

3. A rotary internal combustion engine as set forth in claim 1 wherein the means for delivering fuel from said charging rotor includes a port provided in the vane thereof and a stationary valve for said port operable to open said port as said vane swings to an outer position.

4. A rotary internal combustion engine as set forth in claim 1 wherein the fuel delivering means of said main shaft includes an axial bore provided therein and a passage of said charging rotor in communication with said bore and the closed space of said rotor.

5. A rotary internal combustion engine as set forth in claim 1 wherein the passage means from the charging chamber to the valve means includes a channel provided in the structure and valve means.

6. A rotary internal combustion engine comprising in combination, a structure having separate and adjacent charging and power chambers, a mainshaft journalled in said structure and extending through said chambers thereof, valve means rotatable in said structure for receiving compressed fuel from the charging chamber and conducting the same to the power chamber, operative connections between said mainshaft and valve means for rotating the latter from the former, charging and power rotors in said charging and power chambers fixed to said mainshaft and each provided in the periphery thereof with a recess for a vane, charging and power vanes journalled in the recesses of said charging and power rotors for swinging movements between inner and outer positions and having portions wiping the walls of the chambers in rotation of the rotors, the recess and vane of the charging rotor formed to provide a closed fuel space, said mainshaft having means to deliver fuel to said closed space, delivery means for delivering fuel from the closed space of the charging rotor to the charging chamber, passage means from the charging chamber to the valve means, said charging chamber provided in the wall thereof with by-pass means disposed and arranged to by-pass said passage means and valve means, said structure provided with an exhaust chamber, said structure and rotors provided with an air passageway into said exhaust chamber, said valve and power chamber having means for the flow of fuel into said chamber, and the power rotor and power vane provided with passage means for exhaust into said exhaust chamber.

7. A rotary internal combustion engine comprising, a structure having a charging chamber therein, a rotor rotatable in said chamber having a peripheral recess, a hollow vane journalled in said recess and cooperating with the recess to provide a closed fuel space, means for fuel flow, a passageway provided in the rotor of gradually increasing area from said fuel means to said fuel space, said vane having a portion wiping the wall of the chamber in rotation of the rotor, means to receive fuel from said chamber, and the wall of said chamber being provided with a circumferential by-pass groove.

References Cited in the file of this patent

UNITED STATES PATENTS

| | | |
|---|---|---|
| 1,140,870 | Broman | May 25, 1915 |
| 1,256,996 | George | Feb. 19, 1918 |
| 1,349,353 | Wilbur | Aug. 10, 1920 |
| 1,877,250 | Meyer | Sept. 13, 1932 |